United States Patent [19]

Culbert et al.

[11] 4,365,980

[45] Dec. 28, 1982

[54] AIR FILTER ASSEMBLY

[75] Inventors: Robert M. Culbert, Manhattan Beach; Charles E. Miller, San Marino, both of Calif.

[73] Assignee: Farr Company, El Segundo, Calif.

[21] Appl. No.: 294,806

[22] Filed: Aug. 20, 1981

[51] Int. Cl.³ .................. B01D 50/00; B01D 46/52
[52] U.S. Cl. .................................. 55/315; 55/396;
    55/418; 55/419; 55/498; 55/502; 55/510;
    55/521; 55/DIG. 28
[58] Field of Search .............. 55/418, 419, 497, 498,
    55/510, 521, DIG. 28, 315, 342, 394, 396, 502

[56] References Cited

U.S. PATENT DOCUMENTS

| | | | |
|---|---|---|---|
| 1,922,469 | 8/1933 | Borthwick | 55/DIG. 28 X |
| 4,130,405 | 12/1978 | Akado et al. | 55/DIG. 28 X |
| 4,135,899 | 1/1979 | Gauer | 55/497 X |
| 4,189,310 | 2/1980 | Hotta | 55/396 X |
| 4,200,444 | 4/1980 | Witchell | 55/521 X |
| 4,243,397 | 1/1981 | Tokar et al. | 55/498 X |

FOREIGN PATENT DOCUMENTS

| | | | |
|---|---|---|---|
| 926698 | 5/1963 | United Kingdom | 55/510 |
| 1385587 | 2/1975 | United Kingdom | 55/510 |
| 2056307 | 3/1981 | United Kingdom | 55/521 |

Primary Examiner—Kathleen J. Prunner
Attorney, Agent, or Firm—Lyon & Lyon

[57] ABSTRACT

Disclosed herein is a disposable lightweight filter assembly which has a high flow through capacity and which is adapted to be positioned in a relatively small inaccessible space. The assembly includes a cylindrical housing having an air outlet at one end, a plurality of air inlet apertures in the side wall thereof, an offset pleated hollow cone-shaped filter element positioned within the housing and a reuseable air inlet bonnet adapted to be releasably secured to the housing about the air inlet apertures therein for securement of the filter assembly to a hump hose or other air flow coupling. Additionally, the bonnet can include a tubular moisture separator entending from the upstream end thereof. The filter element is supported by one or more beads of an adhesive material circumferentially disposed about the interior and exterior sides thereof and is sealably secured at each end to the housing such that the interior of the cone encircles the outlet while the exterior thereof is inwardly spaced from the air inlet apertures.

7 Claims, 5 Drawing Figures

AIR FILTER ASSEMBLY

BACKGROUND OF THE INVENTION

The invention set forth herein relates to a disposable and lightweight air filter having a relatively large flow through capacity and filter area which is adapted to fit within a relatively small space such as the engine compartment of a truck. The air filter is also constructed to withstand engine vibration and other stress conditions connected with the operation of a large high horsepower engine.

The necessity of filtering the intake air for internal combustion engines to prevent damage and premature wear is well known. For large trucks, there are a number of factors which dictate the necessity of providing an intake air filter having high dust removal efficiency such as: the high cost of the truck engine; the adverse environmental conditions commonly encountered; the high number of operating hours; the expected dependability of engine operation, etc. Moreover, the high volumetric rate of air injection of an internal combustion engine for large trucks requires the air filter to have high air flow capacity. As a result of these requirements, the conventional air filters for large trucks are usually of such a large size to preclude the mounting of the filter directly on the engine or, in many situations, even within the engine compartment. Thus, ducting must be provided for conducting the air from the filter to the intake which produces an air pressure drop and results in a reduction in engine efficiency. Moreover, this ducting is prone to develop leaks and admit unfiltered air to the engine.

Filter assemblies have been developed which meet the required filter area necessary for high dust removal efficiency and yet are sufficiently compact to be mounted directly on the engine. Examples of such filters include those which are described and claimed in U.S. Pat. Nos. 3,831,355 and 3,802,169 and in a filter marketed by Donaldson Co., Inc. of Minneapolis, Minn. under its trademark "Konepac". While these factors can be mounted directly on the engines, they, like the conventional air filters for large trucks, are quite heavy and rather expensive to manufacture. The weight of an air filter on a truck is particularly significant in view of the large number of miles over which such vehicles are driven and the added strain on the truck and its engine caused by any additional weight.

The problems of weight and cost found in the existing compact filters adapted for use on trucks result from their construction wherein a relatively heavy cartridge which holds and supports the filtering media is in turn mounted in an even heavier outer housing. It would be highly desirable to provide an air filter which had sufficient flow through capacity in the filtering area for use on large trucks and was sufficiently compact such that it could be mounted directly on the engine, yet was very light in weight and so economical to manufacture that the filter assembly could be disposable. To this end it would also be desirable to provide a reusable air inlet coupling to obviate the need for including such a device on the disposable filter thereby further reducing the cost of replacement. The present invention provides such a filter assembly.

Another problem associated with such filter assemblies is the installation of the moisture separator which is necessary to prolong the useful life of the filter. The configuration of such devices often require considerable piping to allow gravity to draw the moisture to the pipe walls for separation from the air flow. As quite often not enough space is available for the length necessary to utilize gravity, elbows are required in the pipe line to take advantage of the momentum of the water in the moving air for separation. The use of such elbows not only creates additional installation problems but still necessitates the filter element being spaced several diameters from the elbow to avoid an increase in the pressure drop which is, of course, undesirable. In addition to installation problems, many of the moisture separators through the nature of their construction create an increase in pressure drop. The present invention not only additionally solves the installation problems associated with such filter assemblies but also provides a moisture separator which has no appreciable effect on the pressure drop of the filtration system.

SUMMARY OF THE INVENTION

Briefly, the invention comprises a lightweight filter assembly having a large flow through capacity and filtering area while occupying a relatively small space. The assembly includes a hollow pleated cone-shaped filter element which is sealably secured at each end to an external cylindrical housing having a plurality of air inlet apertures in the side thereof communicating with the interior of the filter element and an air outlet communicating with the interior of the filter element. The filter element is offset from the air inlet apertures and is supported by and its configuration maintained by one or more beads of an adhesive material circumferentially disposed about the interior and exterior sides of the cone-shaped element. A reuseable air inlet bonnet is removeably secured to the housing about the air inlet apertures for communicating the filter assembly with an air flow line. The bonnet can also include, if desired, an inline moisture separator.

It is therefore the principal object of the present invention to provide a disposable air filter assembly which is compact and light in weight while having a large flow through capacity in the filtering area.

It is another object of the present invention to provide an air filter assembly which is of a simple construction and economical to manufacture.

It is a further object of the present invention to provide a disposable filter assembly with a reusable and detachable air inlet coupling.

It is a still further object of the present invention to provide a disposable filter assembly having a reusable and detachable air inlet coupling which reduces the pressure drop across the filter assembly.

It is another object of the present invention to provide a filter assembly which includes a moisture separator which is of economical construction, easy to install and does not appreciably affect the pressure drop across the filtration system.

It is yet another object of the present invention to provide a durable air intake cleaner which is adapted to withstand the pulsating air flow and engine vibrations.

These and other objects and advantages of the present invention will become apparent from the following detailed description taken in conjunction with the accompanying drawings.

DESCRIPTION OF THE PREFERRED EMBODIMENT

Figure 1:
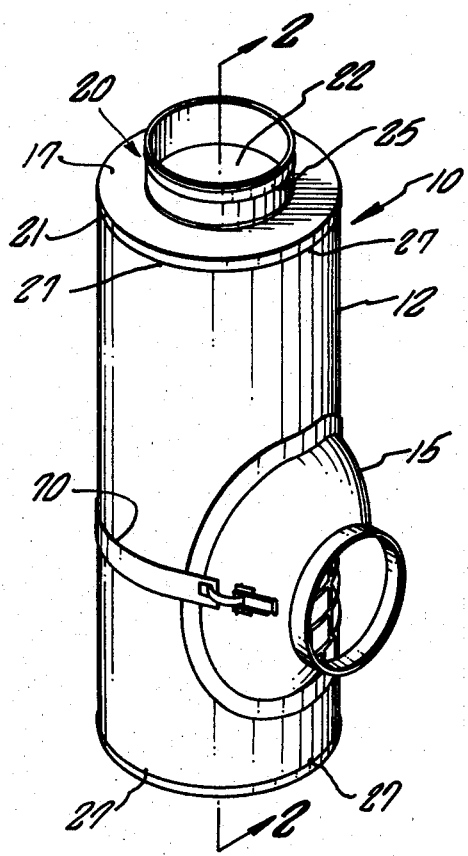
FIG. 1 is a perspective view of the filter assembly of the present invention.

Referring now in detail to the drawings, the filter assembly 10 is comprised of an outer cylindrical housing 12, filter element 14 and an air inlet bonnet 15. The housing 12 has a closed or sealed end 16, a plurality of air inlet apertures 18 disposed in the sidewalls of the housing spaced from the sealed end 16 thereof, and an outlet means 20 disposed at the opposite or open end 22 of the housing. In the preferred embodiment, the outlet means 20 is comprised of a plate 17 defining a large central aperture 19 and a depending outer peripheral flange 21 and an upstanding inner peripheral flange 23. Flange 21 is disposed about and secured to the upper end of housing 12 and the inner peripheral flange 23 is secured to an air outlet tube 25. To prevent air leakage a thixotropic vinyl adhesive is used between flanges 21 and 23 and the upper end of the housing and the lower end of the air outlet tube 25. Drain apertures 27 are provided in the housing adjacent the ends thereof. In the preferred embodiment of the housing, four such apertures of 0.188 inches diameter are equiangularly spaced about each end of the housing.

Figure 2:
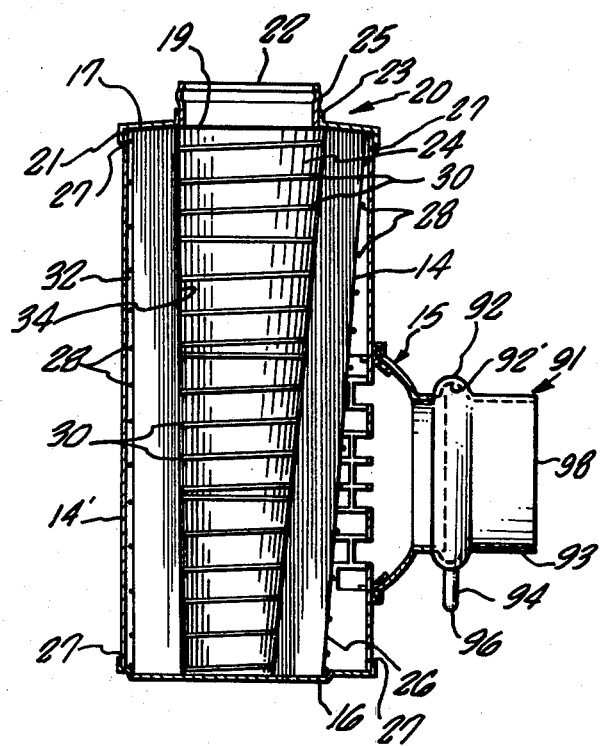
FIG. 2 is a sectional view of the filter assembly of the present invention taken along line 2—2 in FIG. 1.
Figure 3:
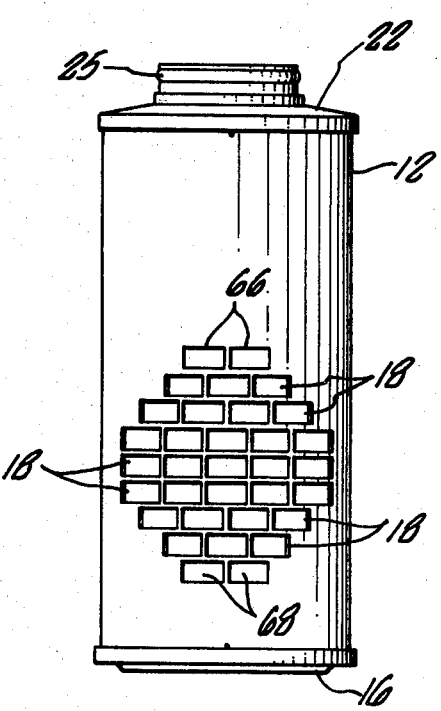
FIG. 3 is a side view of the filter assembly illustrating the air inlet apertures in the side thereof.

The filter element 14 is comprised of a pleated paper filter media which is formed into an offset hollow truncated cone-shaped configuration such that a vertical axis passing through the geometric center of the smaller lower end 26 of the filter element is horizontally spaced from or "offset" from a vertical axis passing through the geometric center of the larger upper end 24 thereof so as to increase the spacing of the lower end of the filter element from the air inlet bonnet 15 as seen in FIG. 2. The formation of this offset is described later herein.

The filter element 14 is secured within the housing 12 such that the larger ends 24 thereof abuts the underside of plate 17 at the open end 22 of the housing, encircling the air outlet aperture 19, and the smaller end 26 of the filter element abuts the sealed end 16 of the housing. The extended ends 24 and 26 of the filter element are sealed to the ends 22 and 16 of the housing respectively with a suitable adhesive to prevent air from passing about the filter element 14 and avoiding filtration. A thixotrophic vinyl adhesive has also proved quite suitable for this purpose.

To provide structural support for the filter element and maintain continual and substantially uniform separation of the individual pleats therein, supporting beads 28 and 30 are circumferentially disposed about the exterior and interior sides 32 and 34 of the offset cone-shaped filter element 14. Both the exterior and interior beads 28 and 30 can be comprised of a hot melt adhesive disposed about a length of cotton cord. A hot melt adhesive well-known in the trade and marketed by National Adhesives, Inc. under its trademark "Instant Lok", No. 34-2969 has been found to provide an excellent hard structural adhesive supporting bead capable of supporting the filter element along its length and maintaining the configuration (shape, spacing, etc.) of the pleats therein. In the embodiment illustrated in the drawing, the supporting beads 28 and 30 are about ⅛ inches to 3/16 inches in diameter and extend spirally along the sides of the filter element at spacings of about 1.25 inches. Preferably, although not necessarily, the exterior and interior supporting beads 28 and 30 are disposed directly opposite each other along the filter element.

In alternate embodiments of the filter element, the hot melt adhesive can be replaced with a polyvinyl acetate adhesive in the exterior supporting bead 28. Further, to increase the temperature resistance of the interior of the filter element, the interior supporting bead 30 can be replaced with a similarly disposed wire, preferably rectangular in cross-section. A galvanized wire of 0.02 inches in depth and 0.1 inches in width has been found to be suitable for such purposes.

In yet another alternate embodiment of the filter element, the supporting beads 28 and 30 can be comprised of a plurality of circular supporting beads disposed along both the interior and exterior sides of the filter element in lieu of the two spirally supporting beads 28 and 30.

This utilization of the aforesaid supporting beads as a supporting member provide a very lightweight and durable self-supporting filter element which can be positioned within the housing 12 in a substantially exposed disposition, i.e., covered solely by the small diameter supporting beads and not by the heavy interior supporting apparatus found in the prior art such as perforated metal sheeting.

To form the offset cone-shaped filter element 14, paper filtering media which is impregnated with a phenolic resin, or other suitable binder, is drawn from a roll of media, pleated and cured in a pleating apparatus and severed therefrom at a given length. Alternatively, it is to be noted that the media could be cured prior to pleating or subsequent to being formed into a filter element. Upon curing, the resin in the media maintains the shape of the pleated media and renders the media water resistant. The severed length of the pleated filter media is then placed in a fan-shaped support frame which has a plurality of arcuate bead guides extending between the sidewalls thereof. A corresponding plurality of beads of hot melt adhesive are then applied across the pleated filtering media following the guides while the media is held within the frame. The pleated media is then removed from the frame and is held in a fan-shaped configuration by the hot melt beads. The filtering media is then wrapped such that the sides thereof are drawn together along a longitudinal seam. The seam is then sealed by a hot melt adhesive defining a truncated cone of filtering media. To obtain the offset configuration of the filter element, the bottom portion of the fan-shaped support frame is bowed in the center so as to push upwardly on the bottom of the filter element prior to forming. Such a distortion will result in offset in the cone of about 3 inches over a height of about 24 inches and, when disposed in housing 12 as described, results in the side 14' of the filter element facing away from the inlet apertures 18 being substantially parallel with and spaced about 0.25 inches from the cylindrical wall of the filter housing.

The cone-shaped configuration for the filter element is employed to reduce the diameter of the housing 12 as the smaller end 26 thereof is then spaced inwardly from the air inlet apertures in the sidewall of the housing. If the filter element were constructed of a columnar or cylindrical configuration, the diameter of the housing would have to be increased to space the filter element from the wall of the housing. The term tubular is used herein to include both configurations of the filter element. Further, by providing an offset cone configuration, the filter element is further removed from the inlet apertures in the sidewall of the housing thereby providing improved air flow within the housing and reducing the pressure drop.

To complete the construction of the filter element 14, the offset cone of pleated filter media is then placed within a suitable apparatus for applying the external and internal supporting beads 28 and 30.

Figure 4:
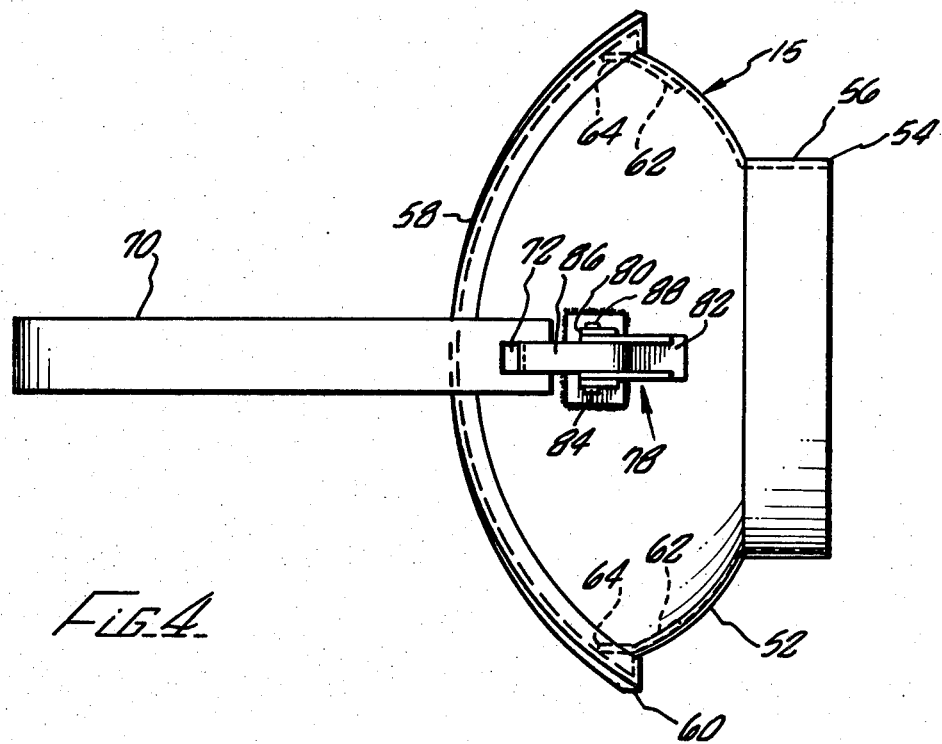
FIG. 4 is a side view of the reusable air inlet bonnet of the present invention.
Figure 5:
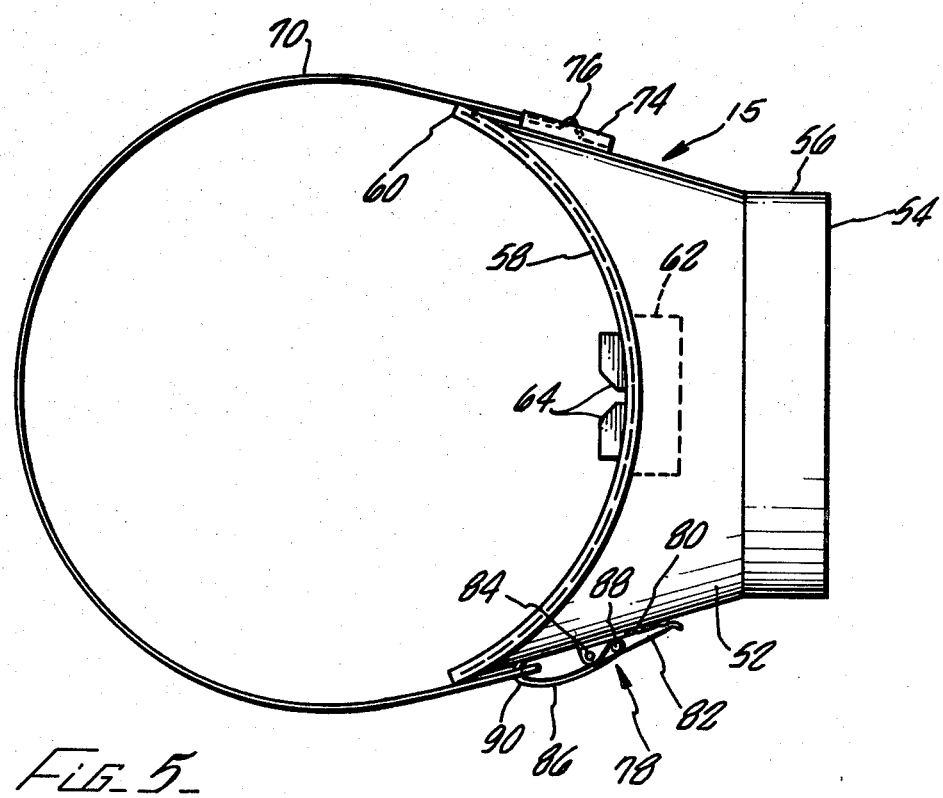
FIG. 5 is a top view of the reusable air inlet bonnet of the present invention.

The reusable air inlet bonnet 15 (see FIGS. 4 and 5) is preferably constructed of mild steel to facilitate construction and painted to resist rusting and is comprised of a conical section 52 terminating at the smaller upstream end 54 in a tubular connector 56 which is preferably integrally formed with the conical section and is adapted to be communicated with and secured to a hump hose or other connector in the air flow line (not shown). The downstream and enlarged end 58 of the conical section 52 is flared slightly and shaped so as to fit about the plurality of air inlet apertures 18 and against the portion of the filter housing surrounding the air inlet apertures. A "U"-shaped gasket 60 of suitable rubber material is disposed about the perimeter portion of the enlarged end 58 of the bonnet 15 to provide an airtight seal between the bonnet and the filter housing.

A pair of plates 62 are disposed on opposite interior sides of the conical section 52 of the bonnet and secured thereto by welds or other suitable fastening means. Each plate defines a pair of projecting ears 64 which are adapted to be received by the uppermost air inlet apertures 66 and the lowermost air apertures 68 in the cylindrical wall of the filter housing thereby preventing movement of the bonnet along the housing wall.

The bonnet is releasably held against and in sealing engagement with the filter housing by a flexible strap 70. While various mechanisms could be employed for releasing and tightening the strap 70 in place about the filter housing, in the embodiment shown in the drawings, the strap 70 is provided with apertures 72 adjacent each end thereof. A fixed bracket 74 having an outwardly projecting ear 76 is affixed to one external side of the bonnet and a pivotally actuated latching mechanism 78 is secured to the bonnet opposite bracket 74. Latching mechanism 78 comprises a fixed bracket 80 secured to the bonnet, a locking arm 82 pivotally connected to bracket 80 at 84 and a latching arm 86 which is pivotally secured at one end thereof to locking arm 82 at 88 and defines a locking flange 90 at its other end. To secure strap 70 in place about the filter housing, the projecting ear 76 on bracket 74 is inserted through one of the apertures 72 in one end of the strap 70 and the extended flange 90 on the latching arm 86 of latching mechanism 78 is inserted through the aperture 72 in the other end of the strap 70. By pivoting the locking arm 82 outwardly from the strap and filter housing, the latching arm and end flange pulls the strap 70 tightly about the filter housing thereby securing the bonnet in sealing engagement with the housing about the plurality of air inlet apertures.

The aforesaid configuration of bonnet 15 not only provides a reusable air inlet for the filter assembly thereby significantly reducing the cost of replacement of the disposable filter assembly, but also provides an enlarged aerodynamic inlet for the housing which has been found to reduce the pressure drop across the filter element thereby increasing the performance of the filter assembly while maintaining the compactness thereof. Further, the bonnet 15 is also adaptable for use with a compact water separator shown secured thereto in FIG. 2.

The water separator 91 comprises a tubular extension 93 having a projecting rib 92 which defines an enlarged interior annular portion 92' at the downstream end thereof and a drain tube 94 extending downwardly from the rib 92. The drain tube 94 terminates at its extended lower end in a drain aperture 96. By way of example, the tubular extension 93 has an outside diameter of 7 inches, a length of about 4.7 inches and an 8.5 inch diameter across the expanded portion 92. The drain tube is 5 inches long, has a one inch diameter and 0.25 inch drain hole in the end thereof. In a typical installation, the upstream end 98 of the water separator is secured to the inline pipe at an elbow which causes the water in the moving air to be carried against the interior wall of the separator. The water then runs into the enlarged annular portion 92' of the separator and down the drain tube through aperture 96. This configuration has been found to provide a very economical and efficient moisture separator and is particularly adapted for use with air filter assembly 10.

Various changes and modifications may be made in carrying out the present invention without departing from the spirit and scope thereof. Insofar as these changes and modifications are within the scope of the appended claims, they are to be considered as part of the invention.

We claim:

1. A filter assembly particularly adapted for use as an air intake filter on large trucks comprising a cylindrical walled housing having a closed end, an open end and at least one air inlet aperture in the sidewall thereof, said open end defining a first annular sealing surface disposed about a central air outlet aperture; a hollow offset frustoconically-shaped filter element formed of a pleated filter medium disposed within said housing with one end thereof being in sealing engagement with said closed end of said housing, the other end in sealing engagement with said first sealing surface about said air outlet aperture and the portion of said filter element facing said air inlet aperture in said housing tapering inwardly from said first annular sealing surface on said open end of said housing to said closed end; and a removable air inlet bonnet adapted to be releasably secured to said housing externally adjacent said air inlet aperture in the sidewall thereof, said bonnet defining a hollow substantially frustoconically body portion, one end of said body portion defining a second annular sealing surface and the other end thereof terminating in a tubular air intake extension and means for releasably securing said second sealing surface against said housing and about said air inlet aperture therein.

2. The combination of claim 1 wherein said sealing surface defined by said air inlet bonnet defines a first transverse dimension and said tubular extension defines a second transverse dimension and said first transverse dimension is substantially larger than said second transverse dimension.

3. The combination of claim 2 wherein said securing means comprises a strap adapted to be disposed about said housing, the ends of said strap being releasably secured to said body portion of said bonnet and means carried by said bonnet for releasing and tightening said strap about said filter housing.

4. A filter assembly particularly adapted for use as an air intake filter on large trucks comprising a cylindrical walled housing having a closed end, an open end and a plurality of air inlet apertures in the sidewall thereof, said open end defining a first annular sealing surface disposed about a central air aperture; a hollow offset frustoconically-shaped filter element formed of a pleated filter medium disposed within said housing with one end thereof being in sealing engagement with said closed end of said housing, the other end of said element being in sealing engagement with said first sealing surface about said air outlet aperture and the portion of said filter element facing said air inlet apertures in said housing tapering inwardly from said first annular sealing surface on said open end of said housing to said closed end; a removable air inlet bonnet adapted to be secured to said housing externally adjacent the air inlet apertures in the sidewall thereof, said bonnet defining a hollow substantially frustoconical body portion, one end of said body portion defining a second annular sealing surface adapted to be disposed against and in sealing engagement with said filter housing about said air inlet apertures therein and the other end of said body portion terminating in a tubular air intake, a sealing gasket disposed about said second annular sealing surface, projecting ears disposed on opposite sides of said bonnet, said ears being adapted to be disposed within said air inlet apertures in said housing to prevent relative sliding movement between said housing and said bonnet, and means for releasably securing said second sealing surface against said housing and about said air inlet apertures.

5. The combination of claim 4 wherein said securing means comprises a strap adapted to be disposed about said housing, the ends of said strap being releasably secured to said body portion of said bonnet and means carried by said bonnet for releasing and tightening said strap about said filter housing.

6. The combination of claim 4 including a tubular member secured to and extending from said tubular air intake of said bonnet, said tubular member defining an enlarged annular interior area adjacent said tubular air intake of said bonnet, a drain tube carried by said tubular member, communicating with said enlarged interior area and defining an aperture in the extended end thereof.

7. A filter assembly particularly adapted for use as an air intake filter on large trucks comprising a cylindrical walled housing defining an air outlet at one end thereof and air inlet in the sidewall thereof; a hollow frustoconically-shaped filter element of formed pleated filter medium disposed within said housing such that one end thereof is disposed about said air outlet, the other end thereof being in sealing engagement with said housing, said filter element tapering inwardly from said one end to said other end thereby spacing said filter element from said air inlet in the sidewall of said housing; and a removable air inlet bonnet adapted to be secured to said housing externally adjacent the air inlet in the sidewall thereof for reducing the pressure drop across said filter element and eliminating moisture from air flowing therethrough, said bonnet defining a hollow substantially frustoconical extension, one end thereof defining an annular sealing surface and the other end thereof terminating in a tubular air intake extension, an annular rib portion adjacent said other end of said substantially frustoconical extension, a tubular member carried by said annular rib portion and extending perpendicularly therefrom, one end of said tubular member communicating with the interior of said extension and the other end of said tubular member defining a drain aperture therein and means for releasably securing said sealing surface of said bonnet against said housing and about said air inlet aperture.

* * * * *